US005619635A

United States Patent [19]
Millman et al.

[11] Patent Number: 5,619,635
[45] Date of Patent: Apr. 8, 1997

[54] PROGRAM CONTROLLED SYSTEM FOR FORMS ENGINEERING

[75] Inventors: Frank Millman, Miami Beach; Phillip Bolin, Boynton Beach; Frank E. Haggar, Boca Raton; H. Richmond Ackerman, Ft. Lauderdale, all of Fla.

[73] Assignee: F3 Software Corporation, Burlington, Mass.

[21] Appl. No.: 551,761

[22] Filed: Nov. 7, 1995

Related U.S. Application Data

[63] Continuation of Ser. No. 838,479, Feb. 19, 1992, Pat. No. 5,490,243, which is a continuation-in-part of Ser. No. 628,435, Dec. 13, 1990, abandoned.

[51] Int. Cl.⁶ .................................................. G06F 15/00
[52] U.S. Cl. ............................................ 395/768; 395/792
[58] Field of Search .................................. 395/148, 145; 364/419.1

[56] References Cited

U.S. PATENT DOCUMENTS

| | | | |
|---|---|---|---|
| 4,205,922 | 6/1980 | Pascoe | 400/171 |
| 4,314,357 | 2/1982 | Kimura et al. | 395/148 |
| 4,353,653 | 10/1982 | Zimmerman | 400/70 |
| 4,460,975 | 7/1984 | Torkelsen et al. | 395/148 |
| 4,495,582 | 1/1985 | Dessert et al. | 364/469 |
| 4,539,653 | 9/1985 | Bartlett et al. | 395/148 |
| 4,546,449 | 10/1985 | Masaki et al. | 395/102 |
| 4,651,288 | 3/1987 | Zeising | 395/117 |
| 4,783,760 | 11/1988 | Carosso | 364/419.17 |
| 4,797,832 | 1/1989 | Axelrod et al. | 364/478 |
| 4,800,506 | 1/1989 | Axelrod et al. | 364/478 |
| 4,803,643 | 2/1989 | Hickey | 395/147 |
| 4,829,468 | 5/1989 | Nonaka et al. | 395/117 |
| 4,849,883 | 7/1989 | Mitchell et al. | 395/101 |
| 4,853,869 | 8/1989 | Durst, Jr. et al. | 364/478 |
| 4,858,114 | 8/1989 | Heath et al. | 395/775 |
| 4,862,386 | 8/1989 | Axelrod et al. | 364/518 |
| 4,881,197 | 11/1989 | Fischer | 395/600 |
| 4,930,089 | 5/1990 | Hatakeyama et al. | 395/105 |
| 4,939,670 | 7/1990 | Freiman et al. | 395/110 |
| 4,951,233 | 8/1990 | Fujiwara et al. | 364/523 |
| 4,987,550 | 1/1991 | Leonard et al. | 395/150 |
| 5,001,654 | 3/1991 | Winiger et al. | 364/523 |
| 5,031,115 | 7/1991 | Hayashi | 395/101 |
| 5,040,132 | 8/1991 | Schuricht et al. | 364/523 |
| 5,043,891 | 8/1991 | Goldstein et al. | 364/419 |
| 5,051,926 | 9/1991 | Stevens et al. | 395/155 |
| 5,091,868 | 2/1992 | Pickens et al. | 395/148 |
| 5,119,465 | 6/1992 | Jack et al. | 395/500 |
| 5,132,915 | 7/1992 | Goodman | 364/479 |
| 5,144,693 | 9/1992 | Morgan | 364/518 |
| 5,165,014 | 11/1992 | Vassar | 361/111 |
| 5,170,467 | 12/1992 | Kubota et al. | |
| 5,212,770 | 5/1993 | Smith et al. | 395/155 |
| 5,218,539 | 6/1993 | Elphick et al. | 364/419.1 |

(List continued on next page.)

OTHER PUBLICATIONS

Formtool Encyclopedia of Forms (1990).
Formtool Made Easy (1992).

*Primary Examiner*—Heather R. Herndon
*Assistant Examiner*—Rudolph J. Buchel
*Attorney, Agent, or Firm*—Hopgood, Calimafde, Kalil & Judlowe

[57] ABSTRACT

A data processing system directed to the preparation of complex forms. The system integrates a powerful graphics based form generator with embedded, form-specific logic and provides output of a form Specification Report. The system operates in an interactive manner allowing the user to review modifications to the form as it develops. The system then accesses embedded logic for selecting industry standards default values, compares the user modifications or set-up attributes to the industry standard values, and if need be, augments the user modifications or set-up attributes consistent with the industry standards for form production. Upon completion, the form includes specifications required to control a high speed printing operation. Various ancillary functions are provided, such as programmed strike positions for controlling subsequent fill-in by computer.

9 Claims, 18 Drawing Sheets

U.S. PATENT DOCUMENTS

| | | | |
|---|---|---|---|
| 5,222,211 | 6/1993 | Mueller et al. | 395/161 |
| 5,228,121 | 7/1993 | Fontaine et al. | 395/145 |
| 5,233,683 | 8/1993 | Sasaki | 395/110 |
| 5,241,464 | 8/1993 | Greulich et al. | 364/401 R |
| 5,268,770 | 12/1993 | Yukino | 358/435 |
| 5,359,708 | 10/1994 | Bloomer et al. | 395/148 |
| 5,361,332 | 11/1994 | Yoshida et al. | 395/114 |
| 5,379,372 | 1/1995 | Wu | 395/148 |
| 5,379,373 | 1/1995 | Hayashi et al. | 395/148 |
| 5,390,354 | 2/1995 | de Heus et al. | 395/800 |
| 5,404,294 | 4/1995 | Karnik | 364/419.1 |
| 5,410,646 | 4/1995 | Tondevold et al. | 395/149 |
| 5,475,801 | 12/1995 | Brindle et al. | 395/114 |

PROGRAM CONTROLLED SYSTEM FOR FORMS ENGINEERING

RELATED APPLICATIONS

This is a continuation application of U.S. application Ser. No. 07/838,479, now U.S. Pat. No. 5,490,243, filed Feb. 19, 1992 which is a continuation-in-part of application Ser. No. 07/628,435, now abandoned, filed Dec. 13, 1990.

The present invention generally relates to a method and apparatus for the program controlled preparation of forms. More particularly, the present invention relates to a system that separately provides an enhanced environment for the engineering of complex, graphics-based forms, and thereafter the generation of the control specifications for producing the specified forms on a production scale basis.

BACKGROUND OF THE INVENTION

The requisite completion of vast amounts of paperwork is a consequence of day-to-day activity supporting the institutions and bureaucracies pervasive throughout our society. A large fraction of this paperwork involves the collection and dissemination of information that is repetitive and similarly structured. It has been determined over the years that information such as this is most easily collected and organized on documents known as forms. In this context, the modern day form is a document comprising separate data segments associated with selected bits of information, organized in a manner to facilitate the collection and recording of the information from multiple sources. The form is prepared in blank with guiding prompts and later filled in with the requested information as needed.

The use of forms has accelerated and now represents a significant means for collecting and collating information on a large scale. Probably the most notorious form is Form 1040 used by the Internal Revenue Service for tax collection. This particular form is fairly simple, presenting data segments of information in columnar fashion on two sides of a single sheet. Other forms are significantly more complicated and include multiple pages, carbonless paper for duplicate copies, carbon paper, graphic-based images, adhesive layering, perforated edge effects, fold lines, envelope windows, and a multitude of other characteristics depending on the ultimate use of the form. A common example of a more complex form is the form used in conjunction with credit cards.

The preparation of forms has been primarily the responsibility of professional publishing companies using expensive high speed printing presses. The process begins with the design of a form, wherein the organization of the data segments, selection of paper stock, etc. is layed out and configured. This is a highly labor intensive process requiring skill and experience as many options for the form structure will be mutually exclusive. Mock ups of the form are prepared to confirm alignment and other constraints. Once the form is considered to be final, plates are produced for use on the press. A press run is scheduled and the appropriate paper stock and inks are inventoried for the scheduled run. Often a preliminary run is made to insure the resulting form meets the form specifications. Finally, the press is run and the form produced in quantity. The production forms are shipped to the ordering customer.

Although the above discussion is merely a cursory presentation of the form preparation business, two areas should be noted as relevant to the present invention. The first area is the design and engineering of the form, as reflected by the resulting form specifications. The second area is the actual implementation of these specifications in control of the printing operation. In the past, these two operations were highly labor intensive and independently implemented. The design of the form was often accomplished by hand by a draftsperson. The generated specifications were thereafter interpreted by a technician and used to set the control functions for the printing operation. This procedure is a significant cost factor in form engineering and fails to capitalize in subsequent advances in computer control press operations in an effective manner.

There have been efforts to automate the process of form engineering in the past, but these have been mostly limited to very simple forms having minimal flexibility. For example, computer supported form design systems have been prepared that control printing pursuant to select text based symbols and provide a rudimentary ability to create coarse segments on a form. Systems limited to text based structures simply cannot address the requirements of modern multi-faceted form engineering.

There has been created a need for a system capable of creating an environment for the enhanced engineering of complex forms and further a system that generates form specifications with a protocol conforming to the operator control of high speed printing presses.

SUMMARY AND OBJECTS OF THE PRESENT INVENTION

It is an object of the present invention to provide a system supporting the preparation of a set of form specifications defining the structure and design of a complex form.

It is another object of the present invention to provide a data processing system capable of receiving selected commands and developing a set of form specifications based on the selected commands.

It is another object of the present invention to provide a data processing apparatus that supports the engineering of complex forms on an interactive basis wherein the user selectively enters form constraint information in an iterative fashion. The selected inputs are thereafter presented on a display providing the designer with immediate feedback on the appearance of the selection.

It is a further object of the present invention to provide a method of engineering a complex multi-faceted form wherein selected form constraint information is inputted into an interactive data processing system and combined with specified form attributes to generate a set of form specifications defining the structure, design and manufacturing techniques associated with the respective form.

It is yet another object of the present invention to provide a system for receiving as an input a formatted specification for a complex form and implementing the control of a high speed printing press based thereon.

It is yet another object of the present invention to provide strike positions on a form permitting subsequent computer fill-in of the form.

The above and other objects of the present invention are realized in a data processing system controlled by a stored program comprising a set of instructions capable of creating an enhanced environment directed to the preparation of complex form specifications. The system is divided into specific subroutines each directed to the development of selected attributes of a complex form, such as form design constraints, manufacturing constraints, and production criteria. Use of the system is on an interactive basis, wherein the form designer enters the selected constraint information and thereafter a monitor displays the resulting form modification. This is repeated with the newly entered constraints stored in a specified file corresponding to the current form. Through this process, the system user constructs the entire engineering specification for the form, including all manufacturing and production attributes necessary to produce the form.

In accordance with the varying aspects of the present invention, the system further provides an embedded intelligence to support the designer's efforts. This intelligence is expressed in the use of default values keyed by entered constraint information. In addition, the system prevents the entry of constraint data combinations considered improper or defective. The embedded values are associated with industry standard form parameters defining the appropriate fonts, pitch, ink, envelope window and others accessed automatically upon entry of select inputs. This dramatically reduces the errors associated with forms during and after final production.

In conjunction with the preparation of form specifications in a CAD environment, the system permits the entry of Datablock strike positions; in effect, a field reservation on the form corresponding to computer generated data for subsequent fill-in. In this manner, the form can be automatically filled out by merely assigning address locations to the requisite computer stored data.

The foregoing features of the present invention may be more fully understood by review of the following description of an illustrative embodiment thereof in conjunction with the following drawings.

DETAILED DESCRIPTION OF THE PRESENT INVENTION

First briefly in overview, the present invention is directed to a computer controlled system that provides an enhanced environment for creating and modifying complex forms. The product of this system is a set of form specifications that delineate the manufacturing inputs and process steps associated with the mass production of the designed form. A separate aspect of this system is the ability to generate the form specifications in conjunction with specific field address locations associated with delineated Datablocks. The field address locations, defined as strike positions, create a two-dimensional blank field capable of receiving a computer controlled hardcopy input during an automatic form filling operation. Once the form is completed on the system, it is ready for manufacturing.

Figure 1:
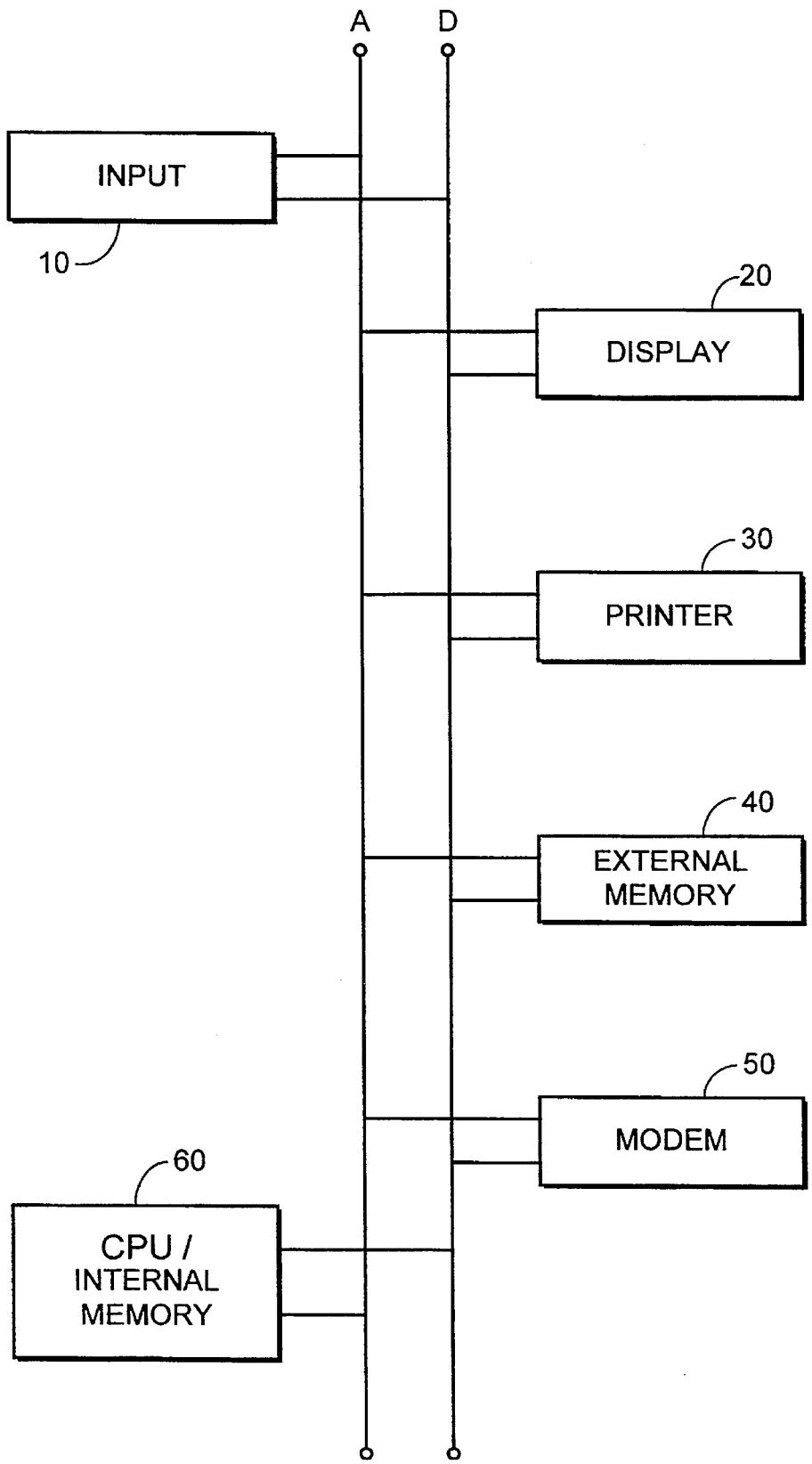
FIG. 1 depicts the functional elements associated with the present invention.

The hardware for implementing the above is not particularly limitative, and the preferred embodiments have been designed for operation in an MS-DOS operating environment on systems as small as an AT class desktop computer. Referring now to FIG. 1, the representative elements of such a system are shown in functional block nomenclature. The interconnection of the various functional blocks is by common bus herein designated by A (address) and D (data) parallel lines. Connected thereto and in communication is input block 10, exemplified by keyboard and/or transducer (mouse) input devices. Continuing in FIG. 1, block 20 represents a display; normally, the display requires a high resolution monitor (VGA or equivalent) as graphic-based information often forms a portion of the resulting and displayed form. Block 30 represents a printer system; again, the graphic nature of the output necessitates a graphics capability for the printer. Block 40 represents the associated external memory capabilities of the system. This may include simply a hard disk drive (conventionally 20 Megabytes) or a separate file server. Normally, the external memory will store the program instructions defining the controlling logic for the system. Block 50 depicts the modem (modulator/de-modulator) to support remote communication. Finally, block 60 represents the microprocessor-based central processing unit (CPU) for implementation of the programmed control instructions.

The logic controlling instructions may be coded in a variety of programming languages consistent and compatible with the associated hardware. In the following presentation, the system is presented in hierarchial fashion ranging from subsystems to subroutines to modules and finally functions. Actual implementation may be hierarchial, menu driven or, as presented herein, combinations of both.

Figure 2:
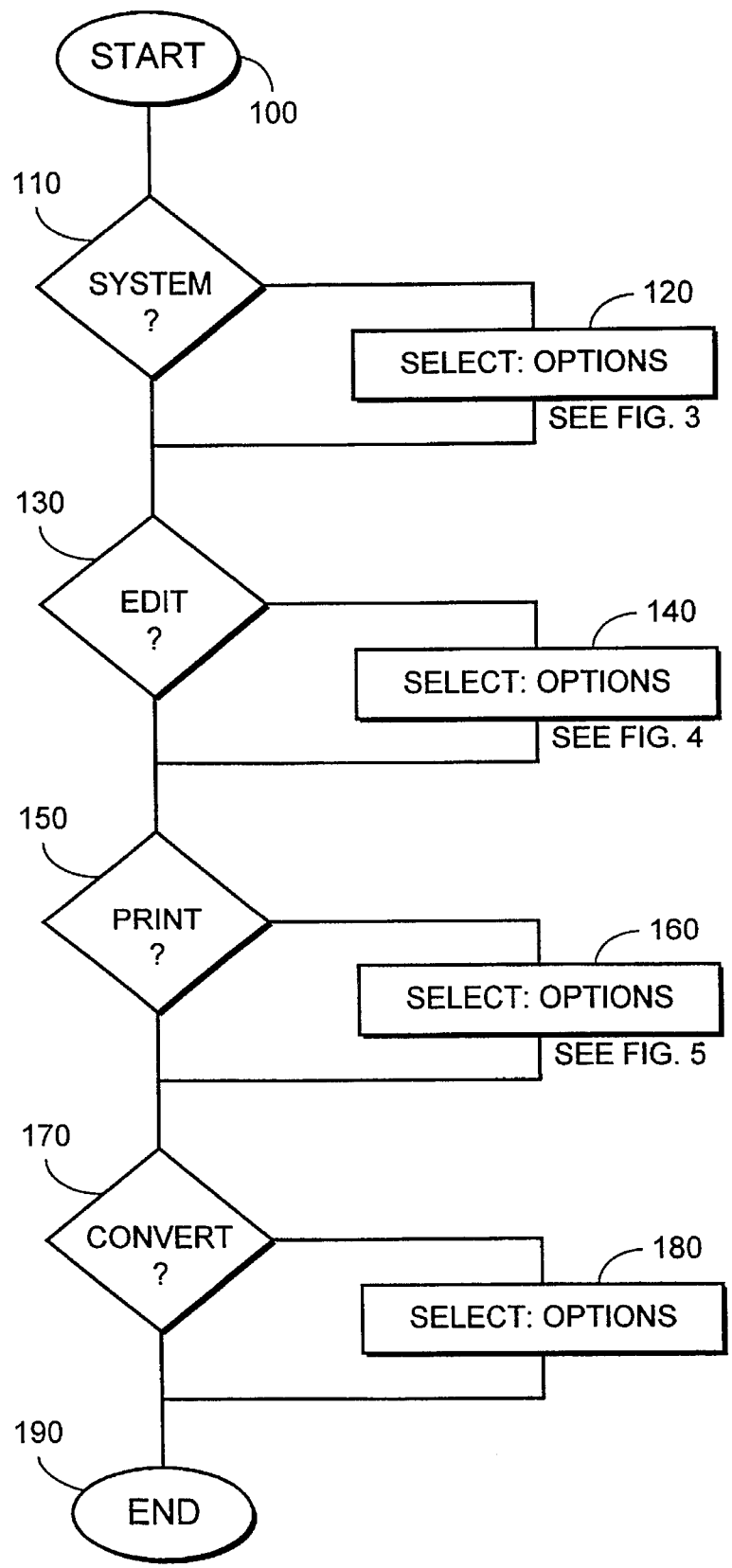
FIG. 2 provides a logic flow chart depicting the major subsystems of the present invention.

Referring now to FIG. 2, a logic flow chart is presented depicting the overall logic structure associated with the preferred embodiment. System operation conceptually starts with block 100 and proceeds to test 110, wherein the user is queried as to whether he wishes to enter the "System" subsystem. A positive response will direct logic to block 120 providing the user a plurality of options associated with System functions. This includes a universal help subroutine triggered by the F1 function key. The help subroutine permits the recall of guiding textural information associated with particular operations within the system's domain. System options also include defining and organizing the font pool, wherein font information is created and placed in selected directories. Finally, the System permits the user to access and implement DOS commands without exiting the current environment. These elements are discussed in more detail in relationship with FIG. 3 below.

Logic thereafter proceeds to the Edit subsystem, test 130. A positive response to this query directs logic to block 140 and a sequence of options are thereafter provided to the user. This particular subsystem is described in more detail in FIG. 4.

Continuing at test 150, the Print subsystem may be accessed and thereby logic directed to block 160 associated with the print subroutine options (discussed in more detail below in reference to FIG. 5). The final subsystem depicted in FIG. 2 is represented by test 170, permitting the user to convert certain selected files. A positive response to test 170 directs logic to block 180 for entry of the user's selections. This pathway is thereafter conceptually terminated on block 190.

Figure 3:
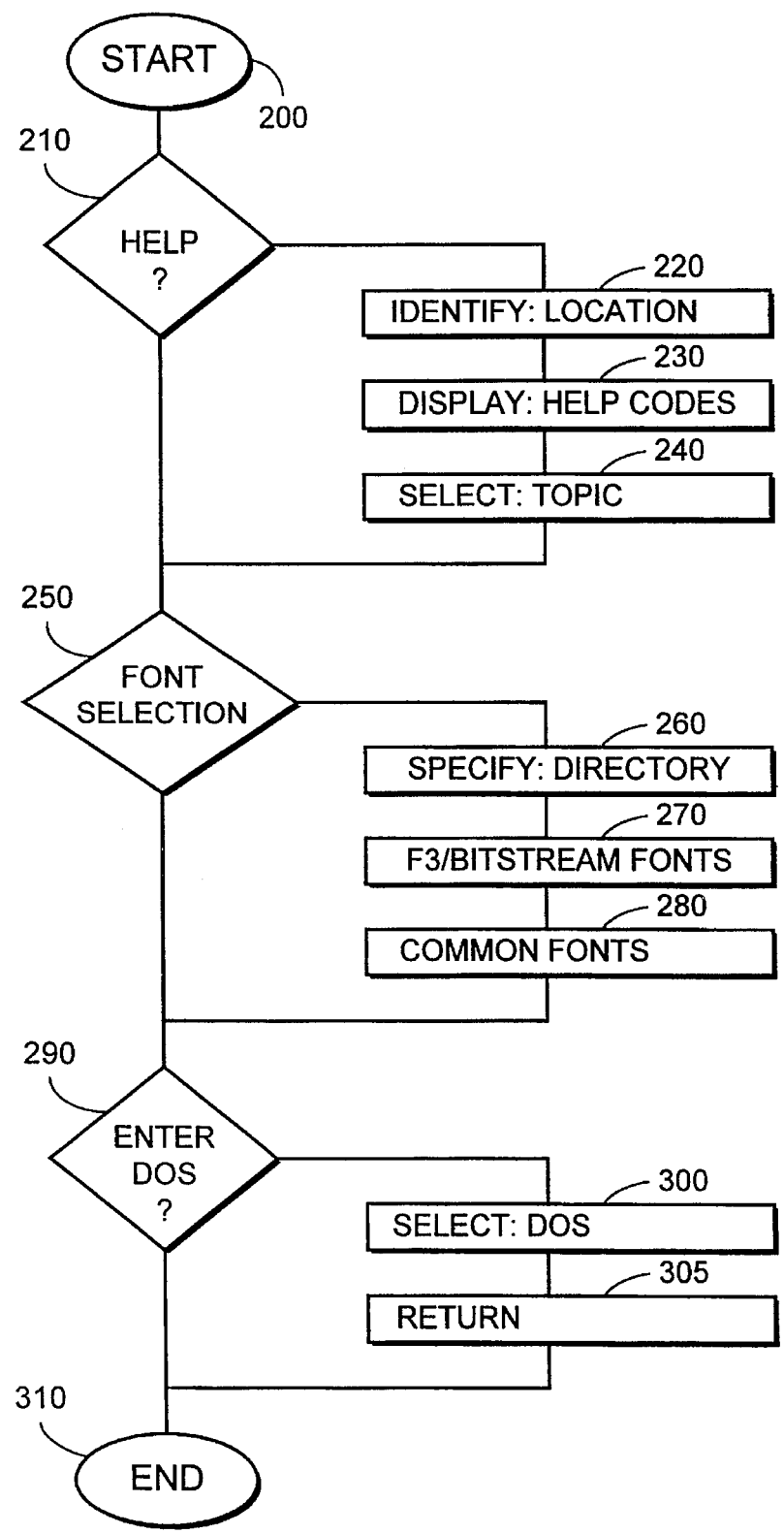
FIG. 3 provides a logic flow chart of the System subsystem.

Now, referring to FIG. 3 the "System" subsystem is depicted and conceptually begins at block 200. Entry into the help subroutine is made via a positive response to test 210. If this occurs, the system first determines the location of the user within the logic framework, block 220. Pursuant to this location, the system accesses the appropriate help code for display to the user, block 230, and further presents a listing of topics for more help information, block 240. Logic thereafter returns and proceeds to test 250, permitting the user to designate select font information. A positive response to test 250 directs logic to block 260, wherein the system displays current font pool information. At block 270, F3 fonts may be designated and at block 280 common fonts are called out. Entered fonts may be stored using the Bitstream convention (filed as "/BTfonts") and thus, are available for other applications.

Logic thereafter returns to test 290, wherein the user may enter the operating system; if so, logic branches to block 300 and the system is sensitized to select DOS commands. Upon completion of the DOS activity, logic returns to the form application at the point of departure, block 305. Passage through the "System" subsystem conceptually terminates at block 310.

Figure 4:
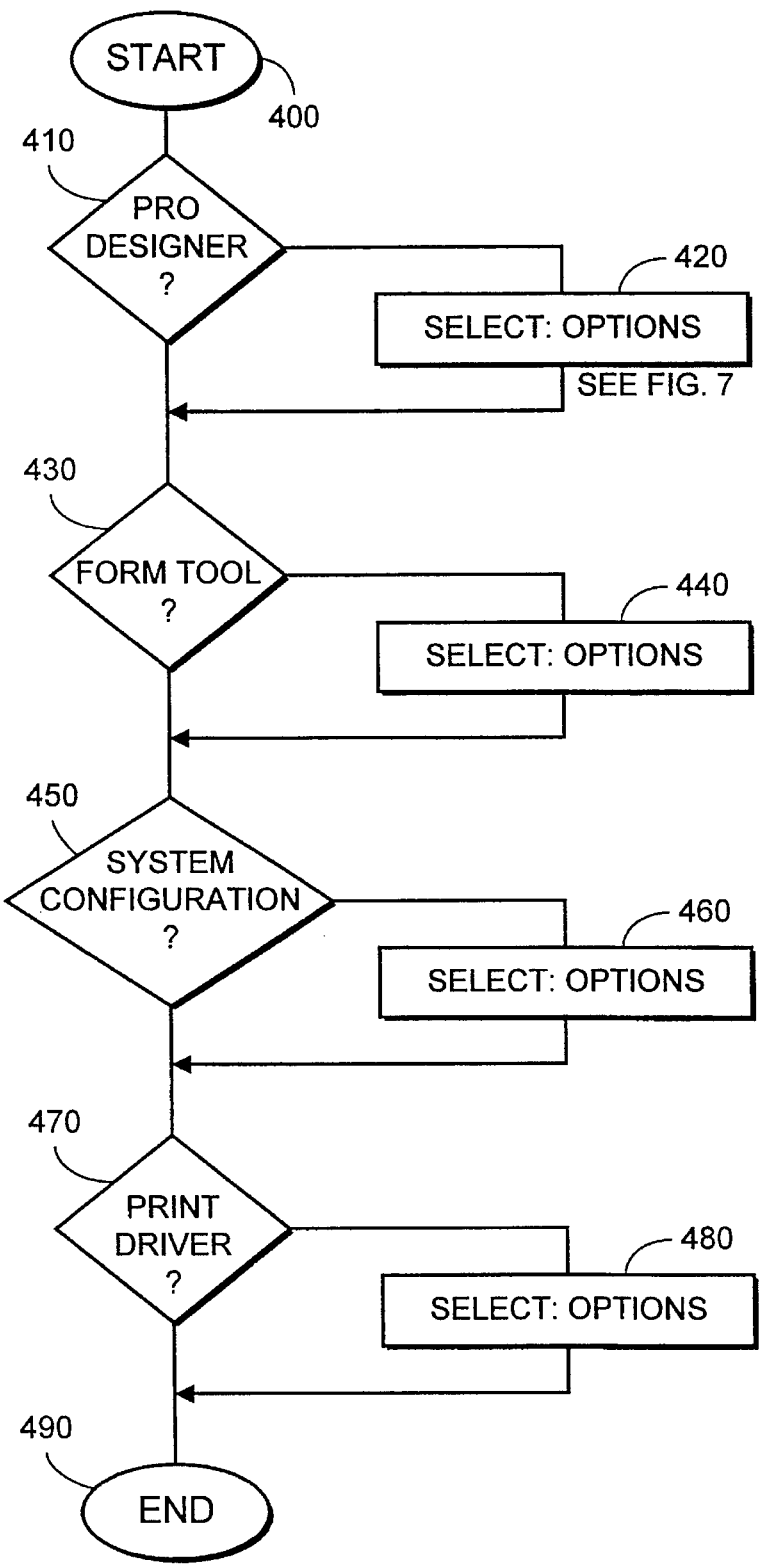
FIG. 4 provides a logic flow chart of the Edit subsystem.

Continuing with the subsystems described in FIG. 2 and specifically with the Edit subsystem depicted in FIG. 4. The Edit subsystem describes the logic associated with the interactive generation of a specific form design and form specification. In this regard, the Edit subsystem creates the environment that permits the rapid entry of selected form attributes and the interactive review of a generated form on a display screen by the user. In addition, certain device configurations, e.g., the printer, are selected and stored in memory in conjunction with the form file.

The Edit subsystem conceptually starts at block 400 and proceeds to test 410, wherein the user may enter the ProDesigner subroutine. The ProDesigner subroutine is directed to the specific selection of form specifications for a given form. A positive response to test 410 branches logic to block 420, wherein the particular options within the ProDesigner are presented to the user. The specifics of this subroutine are delineated in FIG. 7, as is more fully discussed below.

Continuing in FIG. 4, test 430 permits entry into the FormTool subroutine, wherein the specific options are provided to the user, block 440. Thereafter, test 450 permits entry into the system configuration's subroutine, which is likewise branched with block 460 for implementation thereof. The final subroutine depicted in FIG. 4 is directed to modifying the print driver, test 470, and the options pertaining thereto, block 480. This Edit subsystem conceptually terminates at block 490 (End).

Figure 5:
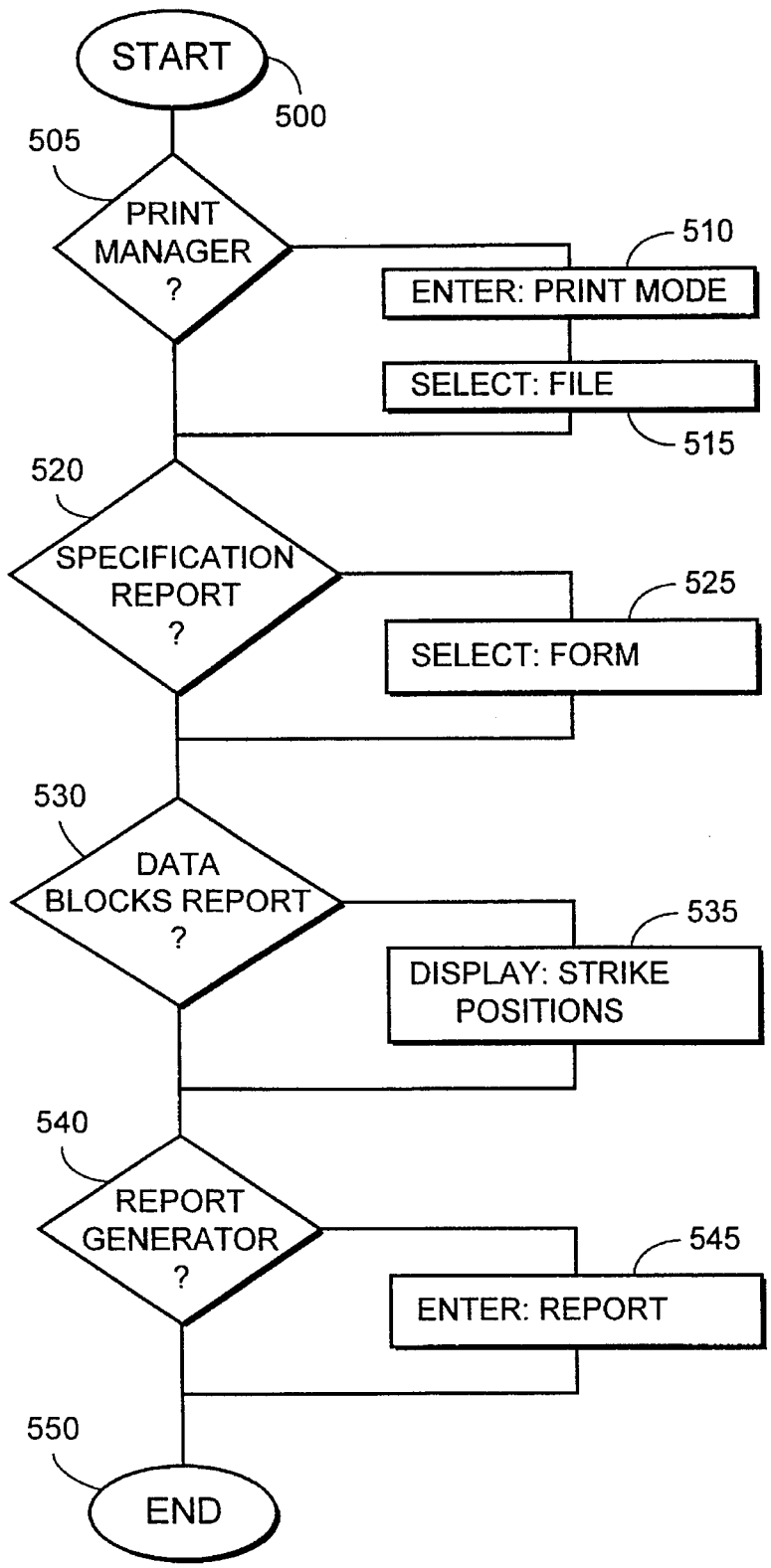
FIG. 5 provides a logic flow chart of the Print subsystem.

In FIG. 5, the logic path associated with the Print subsystem is presented. At test 505 and block 510, the user may designate the print mode. There are four primary modes of printing; production, artwork, manufacturing and data. Each mode relates to a selected "layer" of the engineered form. Production printing permits selected printing of ink objects, via a laser printer for quality control. Manufacturing will print graphic representations of non-ink form specifications, e.g., stubs, folds, etc. Artwork is directed to color separations and ported image files. Data printing provides an overlay of designated strike positions on the form (a strike position is a location identified for receipt of ported information during computer fill-in of the form). In this manner, the user may review in hardcopy different levels of the form design.

At test 520, the user may direct the printing of the Specification Report by designating the desired form file, block 525. In a similar manner, a Datablocks Report is printed via test 530 and block 535. A separate report module, test 540 and block 545, is added to manage a large library of separate forms and provide additional information summaries on these forms, individually or in composite format.

Figure 6:
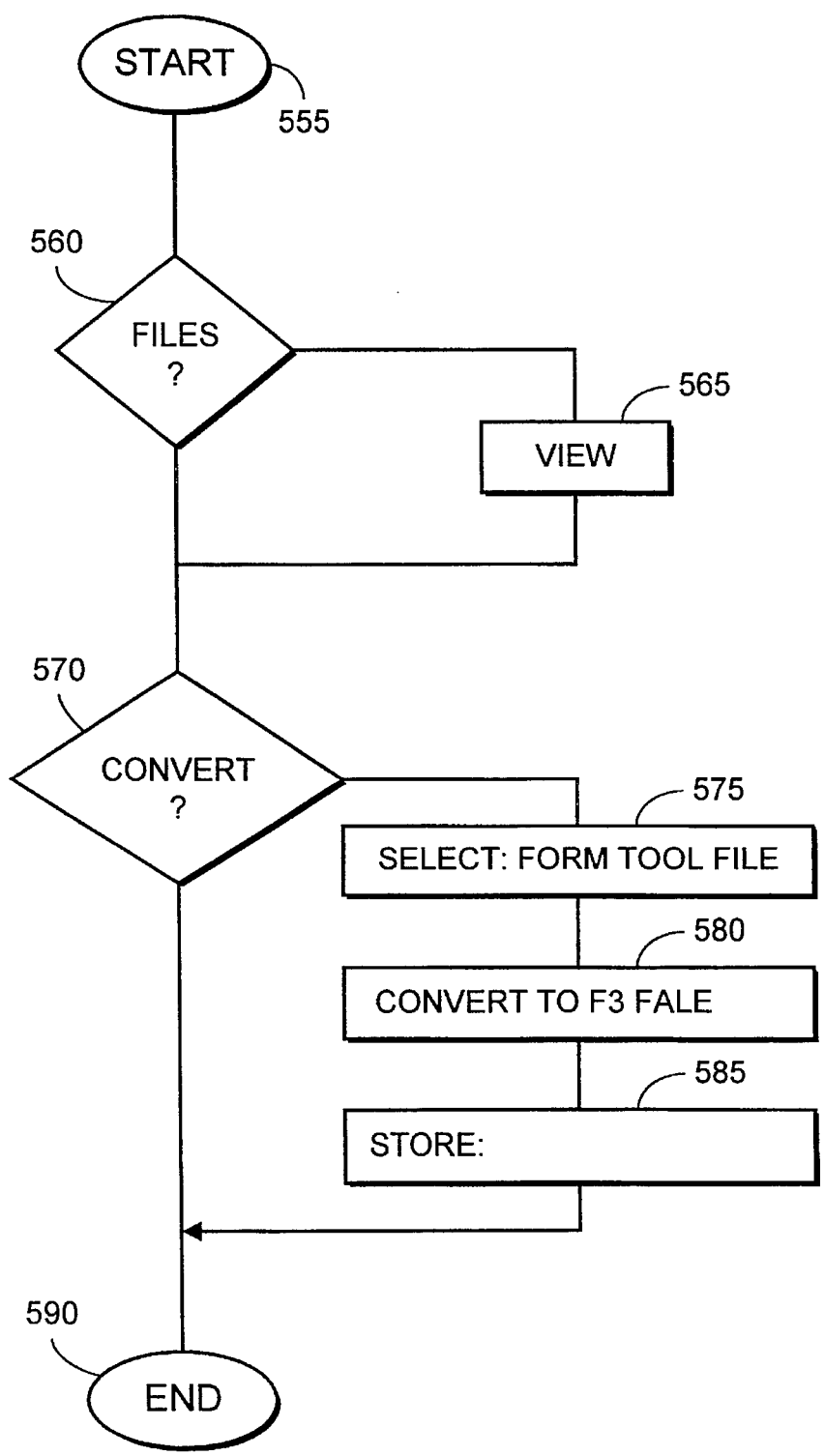
FIG. 6 provides a logic flow chart of the Convert subsystem.

Turning now to FIG. 6, the Convert subsystem is presented. This permits the user to view FormTool files (test 560 and block 565) from a FormTool directory. FormTool files are forms stored in a simplified precursor format. If desired, the user may translate the FormTool form into a F3 ProDesigner form format, via test 570 and blocks 575–585.

Figure 7:
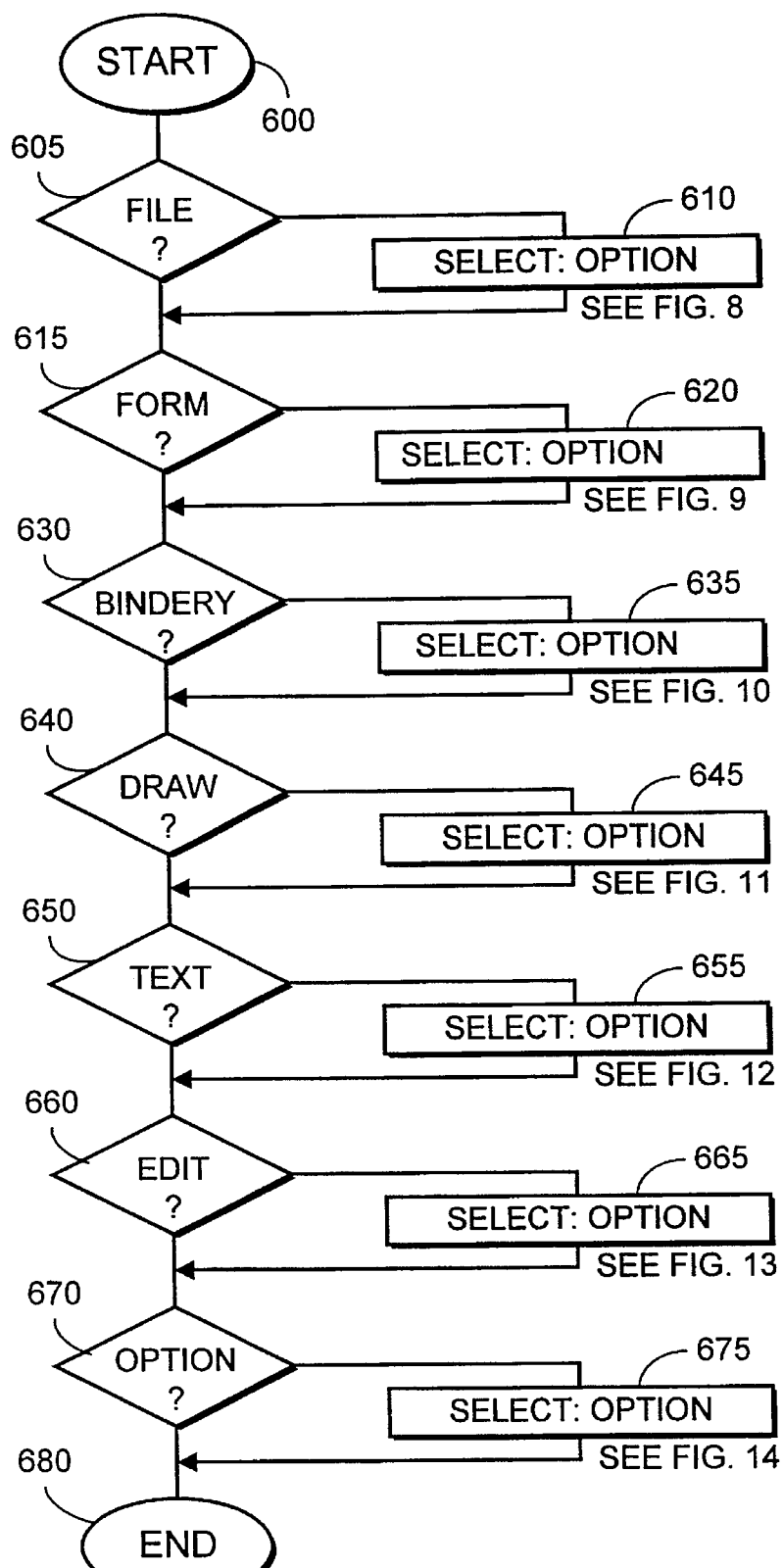
FIG. 7 provides a logic flow chart of the ProDesigner subroutine.

At test 410 of FIG. 4, ProDesigner subroutine was called out. This subroutine is described, in more detail, in FIGS. 7 through 14. ProDesigner is structured as follows and as depicted in FIG. 7: logic conceptually starts at block 600, followed by seven (7) separate modules.

The first module involves file manipulation operations, test 605; a positive response permits user selection of certain file related system functions, as described in FIG. 8 below. This is followed by test 615 directed to form composite options. The form options are discussed in conjunction with FIG. 9, and are presented to the user at block 620. This is followed by test 630 regarding the Bindery module, wherein specific bindery options are presented and triggered at block 635 by the user (see FIG. 10). At test 640, the Draw module may be selected characterized by a subset of options depicted by block 645 (FIG. 11 below). Following the Draw module, logic proceeds to test 650 permitting entry into the Text module with associated text options, block 655. Test 660 and associated branch block 665 permit entry into the ProDesigner Edit module, discussed in detail in reference to FIG. 13. Finally, test 670 specifies select options for the ProDesigner mode that are accessed via block 675 by the user. ProDesigner logic conceptually terminates at block 680.

Figure 8:
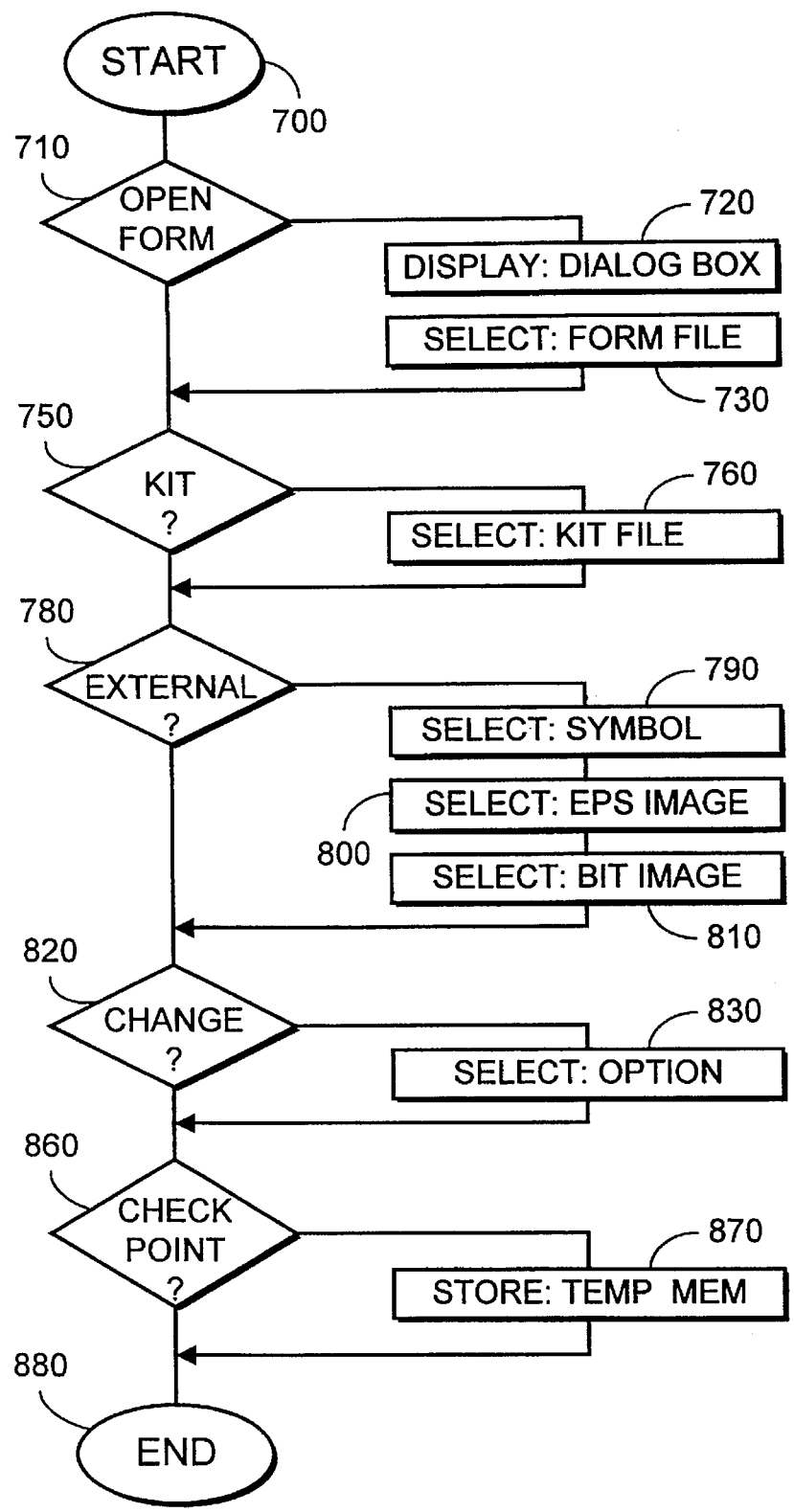
FIG. 8 provides a logic flow chart of the ProDesigner File module.

Referring now to FIG. 8, the logic path of the File module of ProDesigner is presented. This module is directed to specific file maintenance functions associated with the ProDesigner subroutine. Logic conceptually starts at block 700 followed by test 710 permitting user directed opening of files for form specification information storage. If so selected, logic branches to block 720, triggering a screen display of existing files. This display is structured as a "dialog box"; a listing of files available in the instant directory. At block 730, the user may either select an existing form specification file from those listed or name a new file to be created. If a pre-existing file is selected, this is loaded into operative memory.

Continuing to test 750, the user may select certain form kits from the existing file network, block 760. A kit is a form template, i.e., a blank file having rudimentary structure corresponding to typical generic forms. The use of a kit permits the user to bypass some preliminary entry of form structure. Selected kits are thereafter loaded into system operative memory, and logic proceeds to test 780. At this test, the user may access external files that are not in text format. At block 790, symbol files may be recalled, block 800 delineates EPS (Encapsulated PostScript) image files and at block 810 bit image files may be recalled. EPS and bit image files may be placed on the form as either ink or reference images. Ink images designated a printed image whereas a reference image is normally used as an outline for trace.

At test 820, certain modifications to the operative files may be implemented by the user, block 830, including replace, select, or drop. In a similar manner certain aspects of the operative files may be saved, including specific kits, symbols, etc. At test 860, modification of certain selected checkpoints may be accomplished by operative block 870. The ProDesigner file subroutine thereafter terminates at block 880.

Figure 9A:
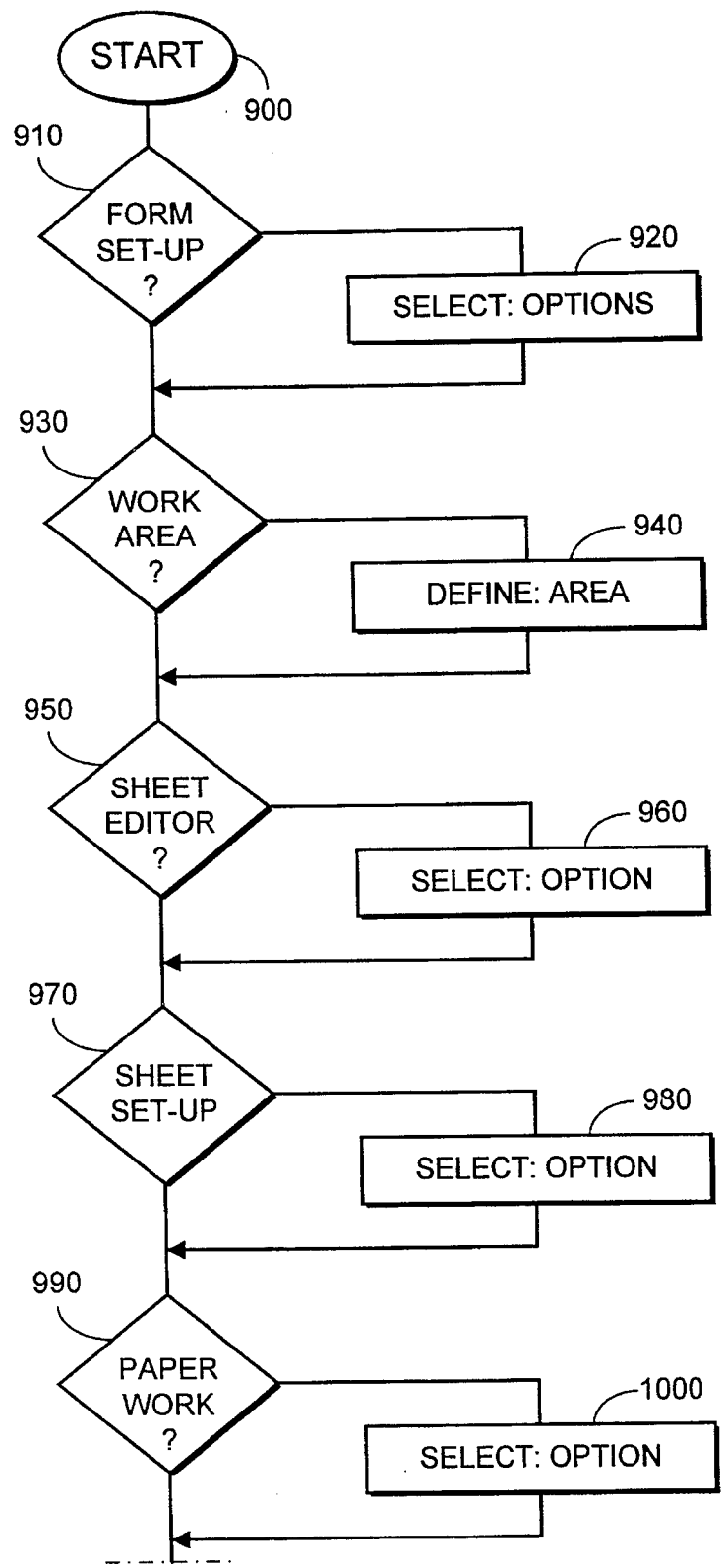
FIG. 9 provides a logic flow chart of the ProDesigner Form module.
Figure 9B:
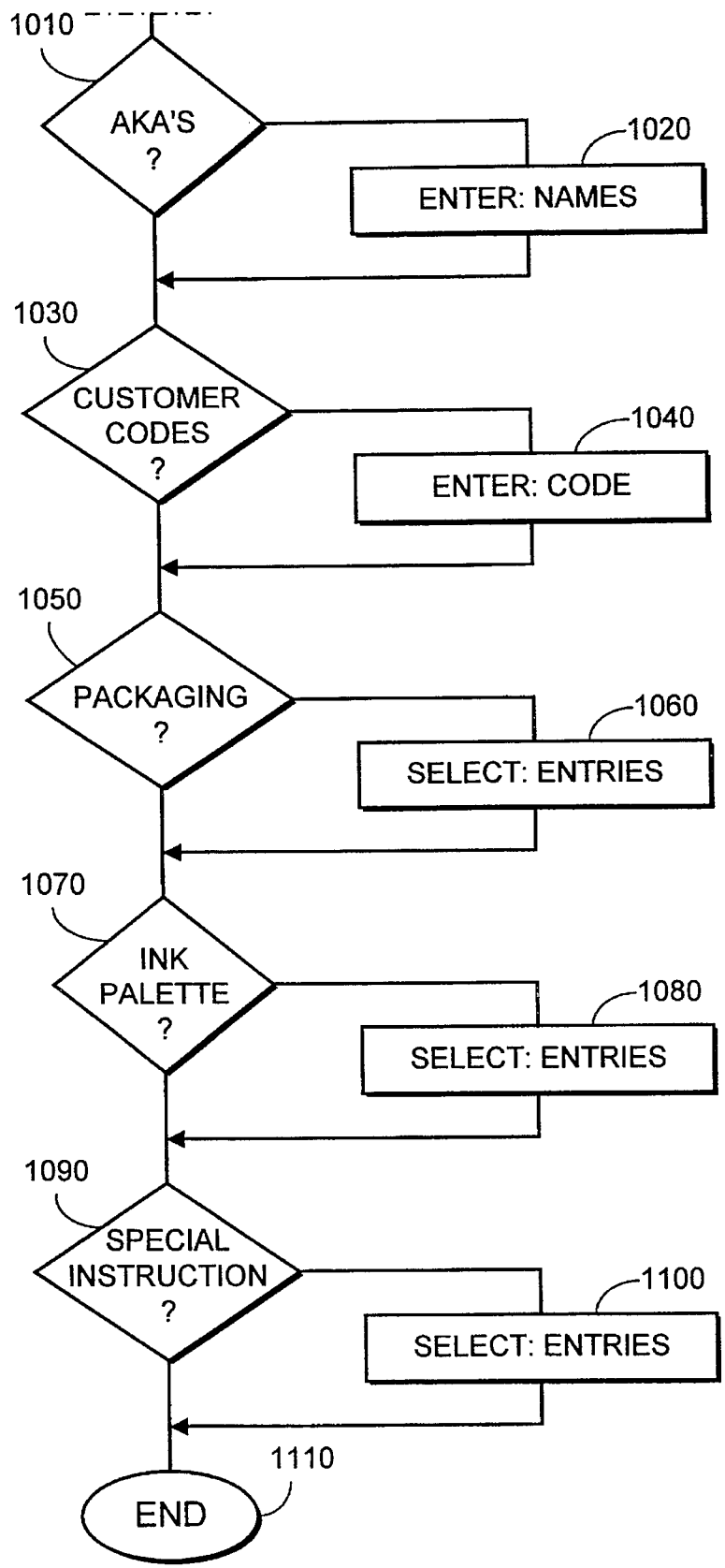

Turning now to FIG. 9, the ProDesigner form module is discussed in more detail. The form module is directed to the individual form specifications delineated by the user that characterize the form structure (i.e., structural attributes of the form). Logic conceptually begins at start block 900, which is followed by test 910 directed to the selection of form setup options. A positive response to test 910 branches to block 920, wherein the form characteristics and size are defined. This includes specifying the form type, press (e.g. web press), art printer (defining print area), carbon interleaving, the number of sheets associated with a given form, the grid format, and the size of the paper for the form. This is followed by test 930 permitting work area definition, block 940. The work area describes the displayed two-dimensional representations of the form surrounded by a border area. In relationship to the form, the outer border may be changed defining a work area external to the actual form surface.

A sheet editor is provided, test 950, with access permitting the selection of certain editor options directed to individual sheets (front and back), such as the ability to copy a sheet, move or delete selected sheets. Entry of these options are made at block 960.

The sheet editor is followed by the sheet setup, test 970. Options associated with a sheet setup include the selection of the type of paper for each sheet in the form and associated carbons. In this context, certain options and combinations thereof are controlled so that obviously erroneous combinations are fault protected. This is exemplified by the inability to concurrently select carbon paper for use with carbonless paper. Other delineations include the type, weight and finish of the paper, stub sizing, and definition of non-printable area. These options are entered at block 980.

Logic thereafter proceeds to the paperwork, test 990. Paper work simply refers to the entry of certain form specific information to be stored in association with the form specifications, such as current version, author, expiration date and other bookkeeping data, block 1000.

Continuing in FIG. 9, other form specific information may be entered within the following sequence. Test 1010 permits entry of the "AKA's", the acronym for "also known as", providing reference to alternate titles and/or labels associated with a given form. This information is material for a family or class of forms related in subject matter, but dispersed within an organization for use by different departments. A positive response to test 1010 will branch the logic path to block 1020 permitting the entry or review of associated AKA's.

Logic thereafter proceeds to test 1030 which, if selected, continues to block 1040 and permits the selective entry of customer code information for storage with the specific form under development. The customer codes permit the user to define and track customers or departments that use a particular form. This data entry file also supports the report generation features (discussed below) that permit the creation of reports which cross-reference forms with particular code structures.

Continuing to test 1050, the user may designate how the form will be packaged for shipping and this information upon entry, via block 1060, will appear on the Specification Report (and other reports specifically called for). More particularly, this information includes the number of forms per group, bound as pads or separately, the number of groups per package and the packaging method to be used (e.g., box, shrink, tie).

Continuing in FIG. 9, logic proceeds to test 1070; a positive response thereto permits the selection and designation of up to six ink colors per form. The system's embedded logic permits the display of industry standard ink format designations, e.g., Pantone Matching System (PMS) with corresponding ink number. Black ink is the only default. The ink palette colors are printed on the Specification Report and may be assigned separately to individual ink objects on the form. Finally, this module terminates with test 1090 permitting the entry of special instructions, via block 1100. The special instructions function permits the user to provide additional information for communication to the manufacturer. It is automatically printed at the end of each Specification Report. For example, if a custom adhesive is selected, the Specification Report will note "SEE SPECIAL INSTRUCTIONS FOR ADHESIVE TYPE".

Figure 10A:
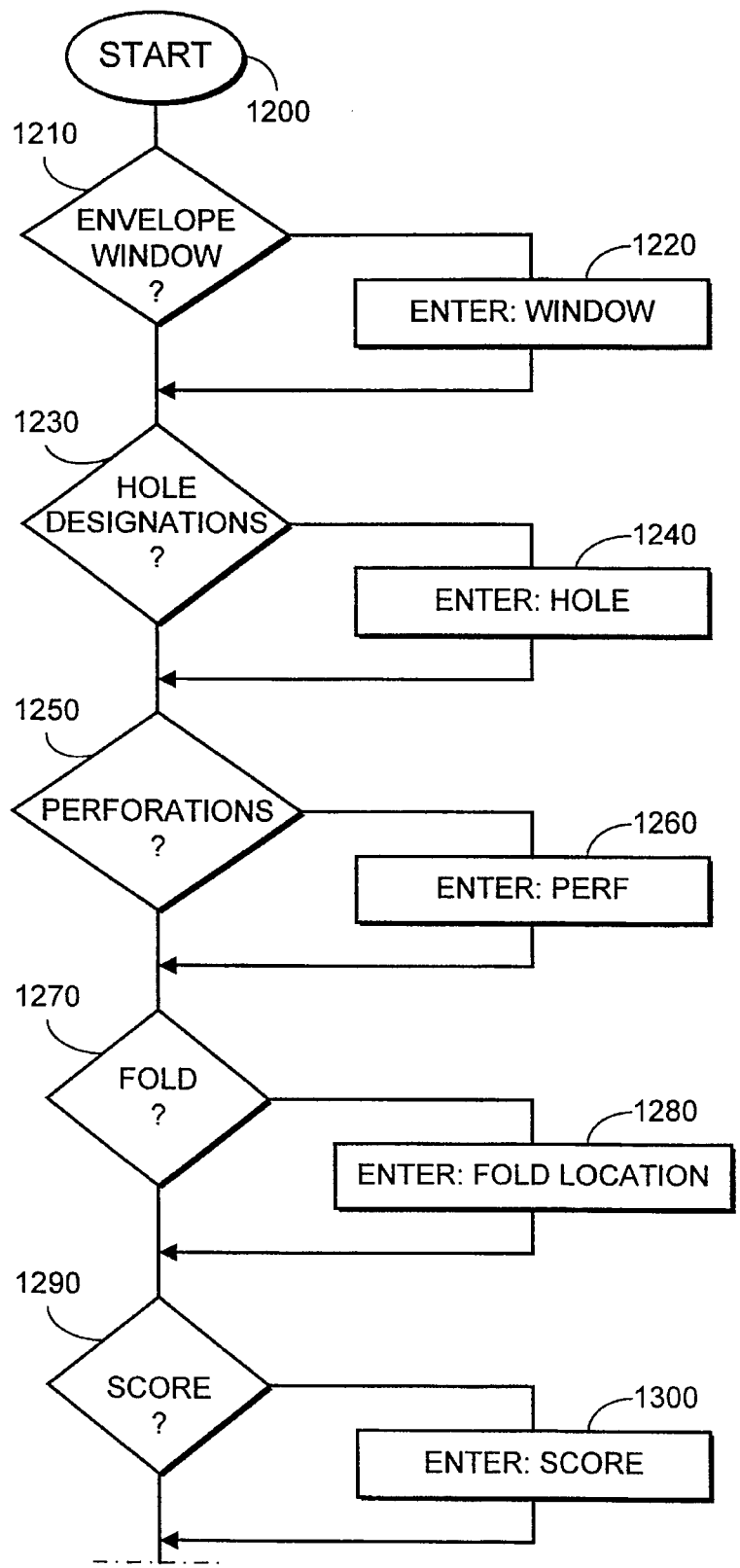
FIG. 10 provides a logic flow chart of the ProDesigner Bindery module.
Figure 10B:
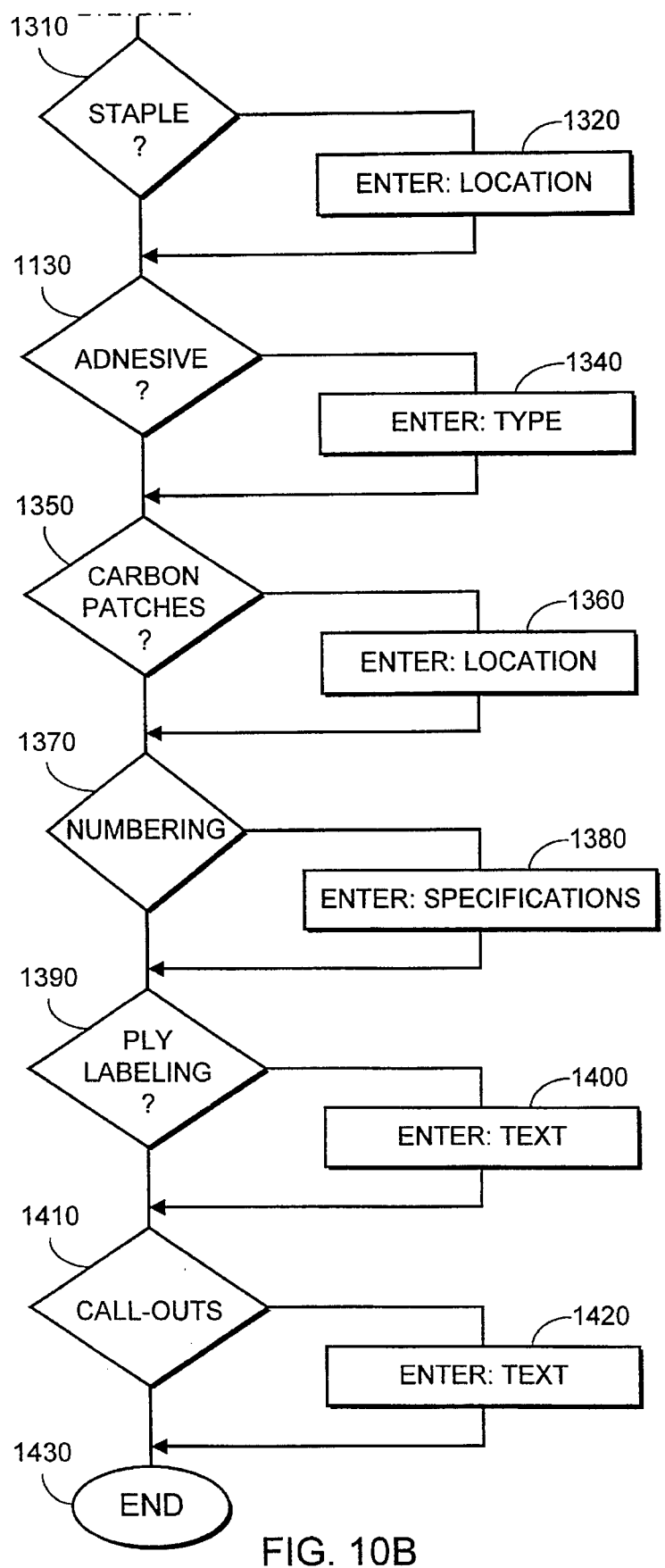
Figure 11:
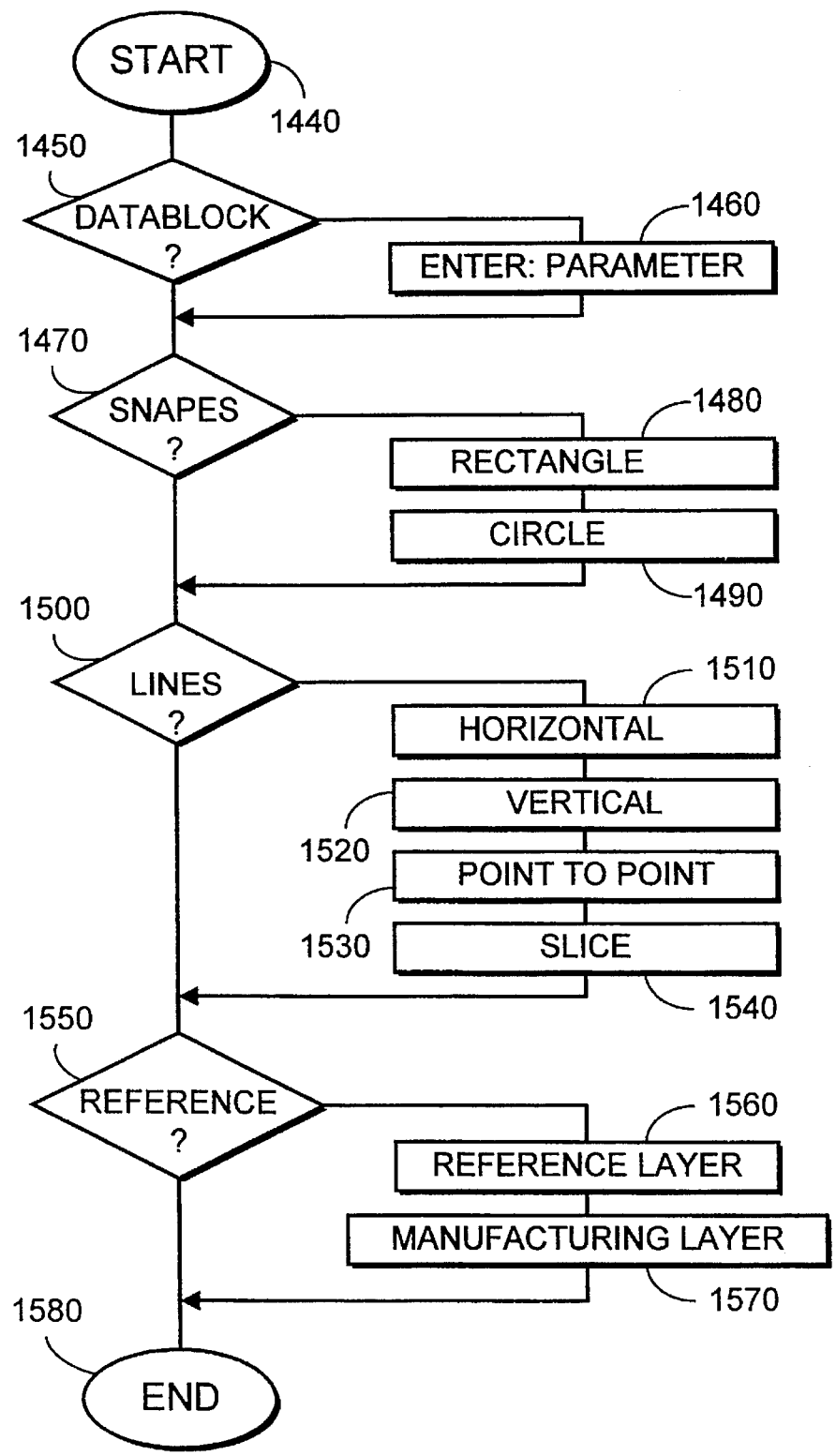
FIG. 11 provides a logic flow chart of the ProDesigner Draw module.
Figure 12:
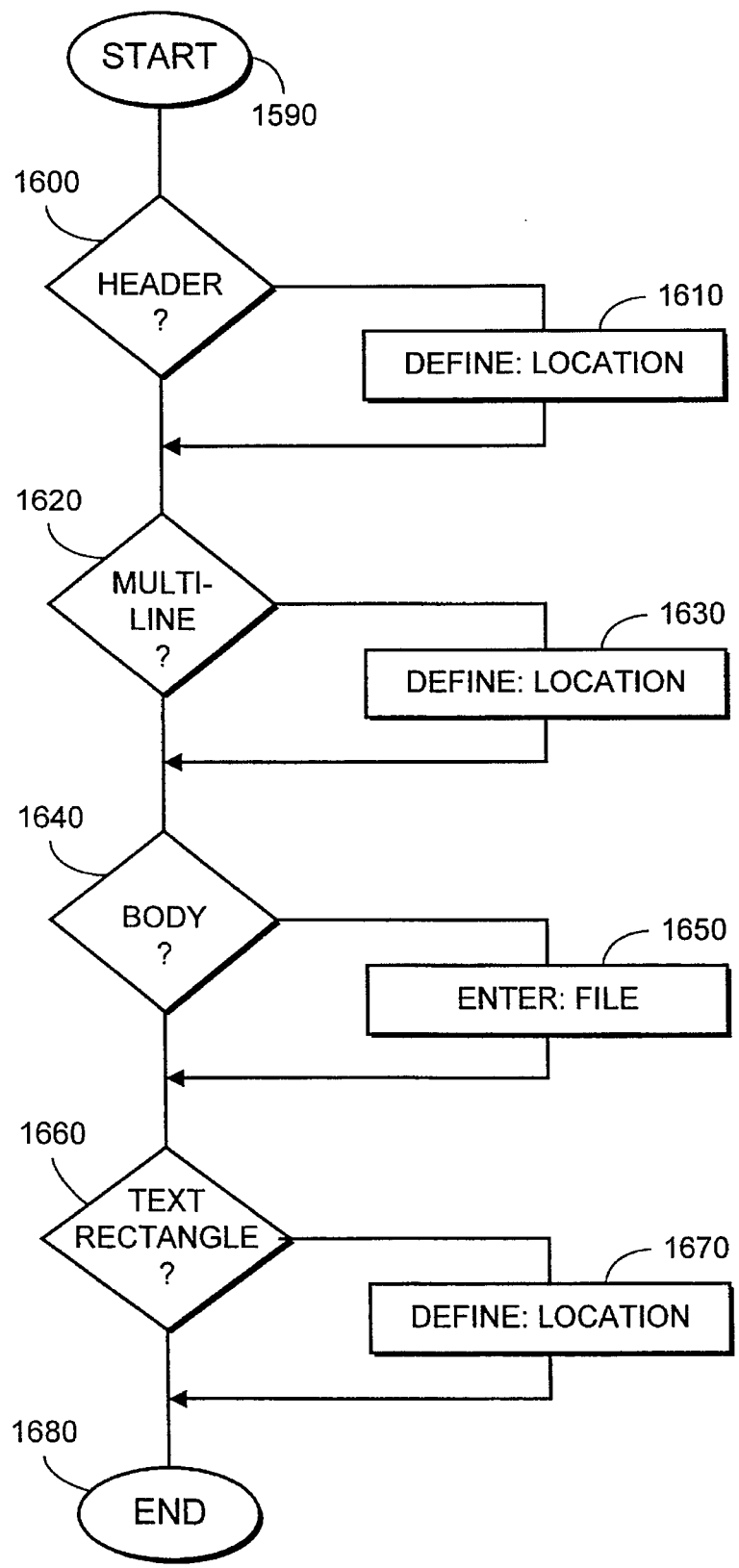
FIG. 12 provides a logic flow chart of the ProDesigner Text module.

Referring now to FIG. 10, a logic flow path is depicted describing the "Bindery" module called out earlier in FIG. 5. This section deals with the selection of parameters governing the manufacturing process as distinguished from the actual printing of the form. Bindery activities include packaging, fastening, drilling, folding, trimming, slitting and numbering, among other operations. Again, the system has embedded logic, wherein the availability of certain bindery operations is specific to the form being generated; that is, the more complicated form type will be subject to more bindery options. In addition, the entry of certain bindery operations, such as staple, hole, perforation, fold and score will appear on all sheets that are currently selected for editing during the Bindery module.

The Bindery module conceptually starts at block 1200 and proceeds to test 1210 permitting the designation of the parameters associated with an envelope window. The envelope window operation performs one of two functions: the area so designated will either indicate an area to be die cut or a reference area where information will show through an envelope window. This latter function permits the accurate placement of the address information on the form. The type of window and size, position and window material are all designated, via block 1220, through the use of the window designation dialogue box.

At test 1230, the user may enter hole designation parameters defining selected manufacturing and/or reference holes; this information is inputted, via block 1240. The reference hole is used for design purposes and a green reference line is automatically generated to keep rules and text away from the hole.

Continuing in the Bindery module, test 1250 permits the user to enter and construct standard perforations on the form. The perforation types include full, partial, full fold/perforation, partial fold/perforation and permutations of each. Perforations run horizontally, vertically, or diagonally. In a similar manner, at test 1270, the user may enter form fold information describing the manufacturing fold specifications for the finished product. Entry of this information is made at block 1280. At test 1290, score information is entered and defined by type, direction and whether score faces in or out.

At test 1310, the location of a staple may be defined, block 1320, in terms of position and angle. In a similar manner, the use of adhesives may be designated, via test 1330. Options include solid line, spot re-moistenable, ⅜ and ½ inch transfer tapes, heat seal and special gluing associated with standard adhesive practice. A special category permits custom adhesive specification, which will be noted in the Specification Report. At test 1350, a carbon patch area can be designated for image transfer in a multi-page form. In this context, the patch is an area less than the entire form sheet. The patching designation may also be used to de-activate image transfer in specific areas when using carbonless paper.

Continuing in FIG. 10, test 1370 permits entry of form numbering information. These numbers have become known in the industry as crash (first page via impact printer) or imprinted numbers. These numbers are often used as a security measure to track missing forms. At test 1390, the system permits the entry of ply label information, applying color-coded words (usually red) located at the bottom of a unit Set form. This information is commonly used for proper routing of select pages of the form, such as "CUSTOMER COPY".

The Bindery module terminates with the entry of call outs, test 1410. Call outs are labels on a form used to assist in the production process. The text for call outs are generated either by the system, via embedded logic, or typed manually for electronic proof markup.

Turning now to FIG. 11, the delineated logic reflects the Draw module associated with the ProDesigner subroutine. In this regard, the system integrates a powerful graphics package permitting the creation of many different shapes and figures. The first option in this module is test 1450, the call out for Datablock designation. The Datablock combines text, text location and a graphic enclosure with a data fillout area. The data fillout area represents a space that can be electronically defined. In this way, a form may be completed automatically by assigning collected file entries (e.g., name, address, etc.) stored in some remote memory, specific form address codes. Pursuant to these address designations and the previously designated Datablocks, the form can be automatically filled.

The Datablock editor permits entry of a list of strike positions corresponding to data fields on the form. ProDesigner automatically draws graphics enclosing and positioning text, the purpose of which is to label the data area surrounding the strike through positions per the specification. This permits a "data" view of the form.

Entry of selected shapes onto the form is accomplished via shape generator, test 1470. The user may select from several common shapes for placement onto the form. The position and orientation of the shape is determined by the user by cursor key or position transducer. This is exemplified by the entry of a rectangle, block 1480, or a circle, block 1490.

At test 1500, logic may be directed to a series of line functions. These include horizontal, block 1510, vertical, block 1520, point to point, block 1530, and slice (halving a shape object with a line). Embedded logic terminates a newly formed line at a logical interrupt point, such as a fold line, margin, etc. Finally in FIG. 11, test 1550 permits the entry of reference line information used to support the layout of objects on the form. Reference lines are entered on the reference layer, block 1560; manufacturing lines, used to guide form manufacturing operations, are entered on the manufacturing layer, block 1570.

The use of conceptual layers as subdivisible units of the form goes as follows. A complete art layer provides a view of graphics, image and text information on a selected sheet. Separate layers may depict different ink colors (e.g., blue print and burgundy graphics). A manufacturing layer presents certain manufacturing attributes as a separate screen display, isolated from the other attributes of the form. These attributes may include continuous stubs, holes and perforations as entered or designated by default. A carbon layer depicts utilization of carbon sheets or patches including positioning and adhesion. A Datablock layer depicts the location of strike positions associated with Datablock designations. The use of the layer approach permits interactive review of key form attributes during the engineering process.

Many forms have prepared text preprinted to guide the entry of requested information. The present invention permits the entry of this text information by the Text module delineated in FIG. 12. The first option is preparation of header text, test 1600. This places a single line of text for selected positioning on the form. In a similar manner, multi-lines of text may be entered, test 1620. For larger volumes of text material, test 1640 permits the preparation of a body of text for precise location within the form. This option also permits the importation of body text from an external memory applying per se well known word processing tools. In either case, the body text is usually combined with a text rectangle, test 1670, as a means for delineating the precise position of the text, and to insure the text is properly layed out within the confines of the space provided.

Figure 13A:
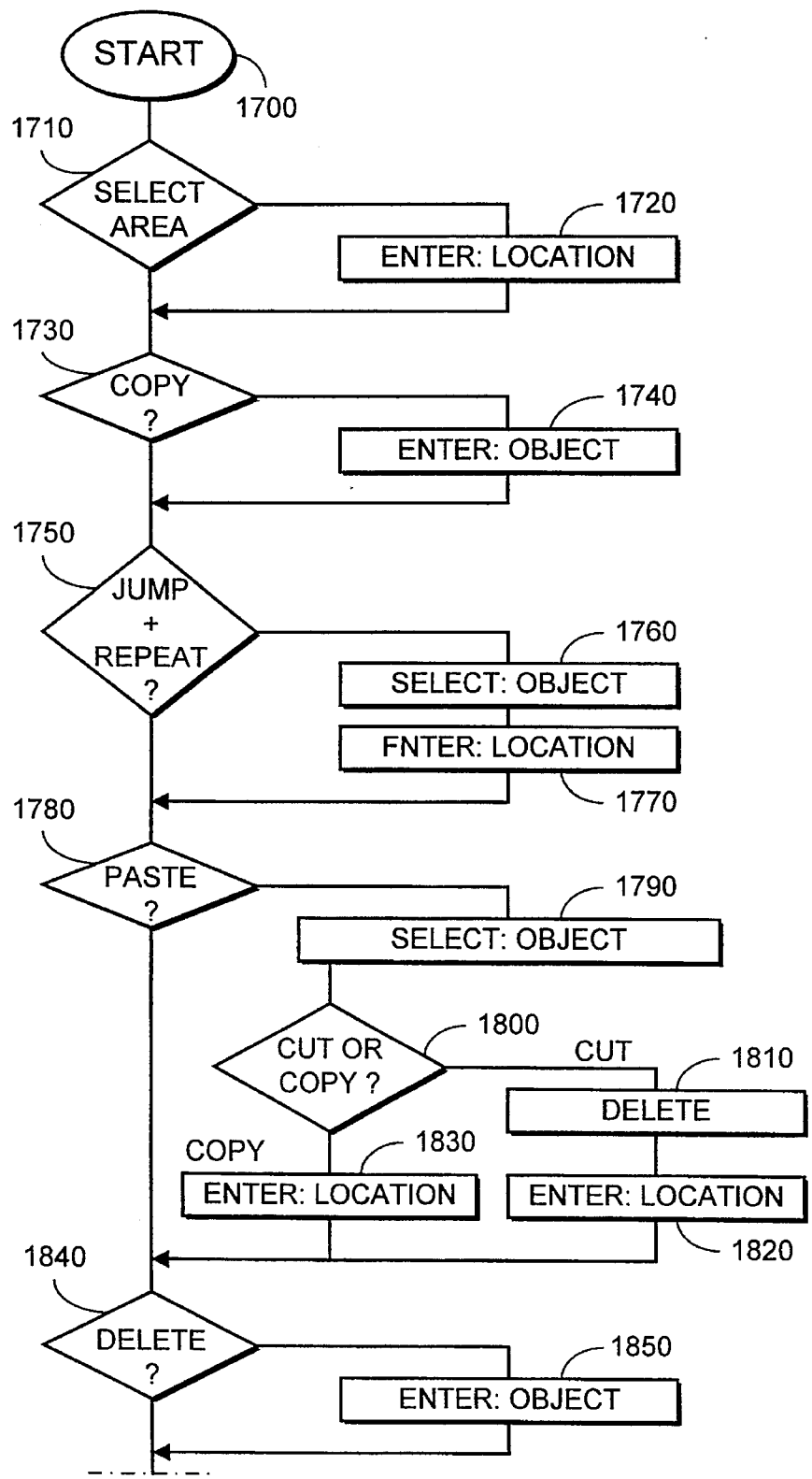
FIG. 13 provides a logic flow chart of the ProDesigner Edit module.
Figure 13B:
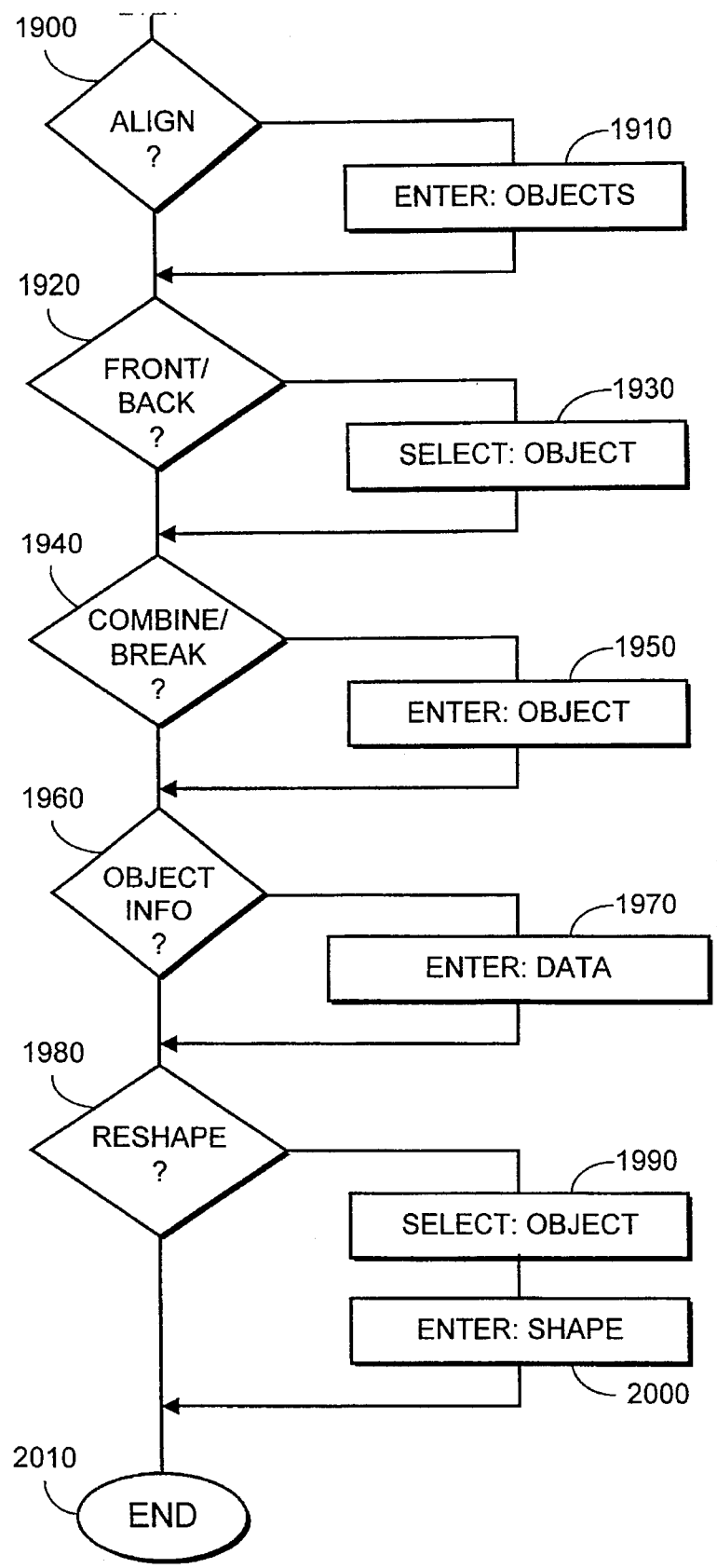

A separate Edit module is provided for the correction or enhancement of previously entered graphic, text and bindery objects. This Edit module is depicted in FIG. 13, and begins with the select area function, test 1710. By designating specific areas for editing, the user can limit the editing effort and preserve portions considered final. The copy function, test 1730, permits a selected object to be duplicated at another location of the form. A plurality of copies may be generated by the jump and repeat function, block 1750. The selected object can be locally stored for use on a different page or new form, test 1760. This includes copy to paste, (retains original) or cut and paste (delete original) as provided through test 1780 et seq. The Edit module permits the deletion of individual objects via test 1840 and block 1850.

Continuing in FIG. 13, the Edit module directs relational aspects of form objects. In test 1900, an object may be aligned with a separate object (e.g. text rectangle or reference line) along a single edge, as designated in block 1910.

At test 1920 objects that overlap are selectively placed in front-back relationship, block 1930. In a similar vein, multiple objects can be joined at test 1940, or broken down to their individual components.

Certain object characteristics are stored with the objects. This information includes the form sheet number, face and dimensions and can be accessed by a positive response to test 1960. The reshape function, test 1980, permits the resizing and stretching of individual points within an object, blocks 1990 and 2000. The Edit module logic terminates at block 2010.

Figure 14:
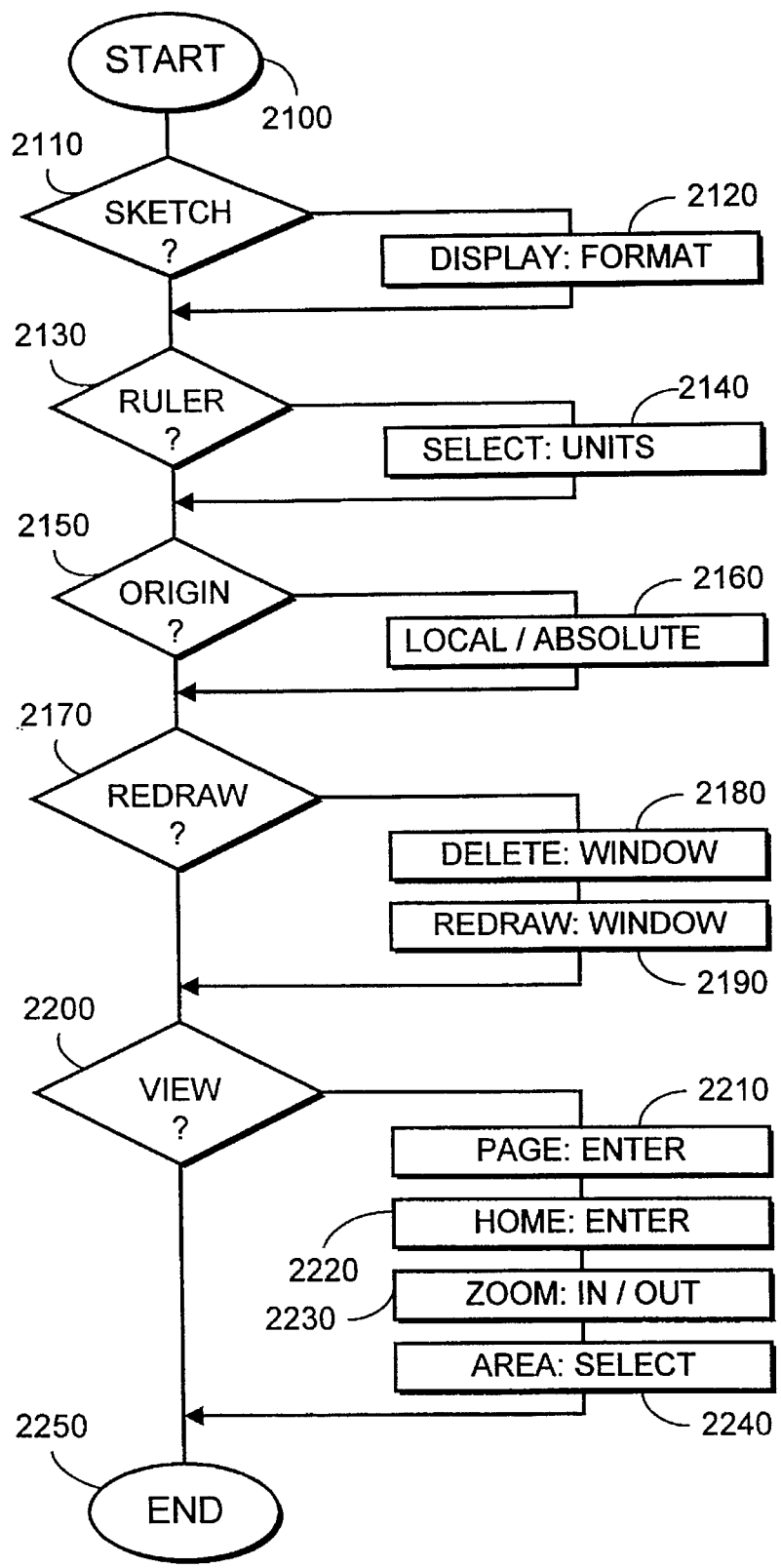
FIG. 14 provides a logic flow chart of the ProDesigner Option module.

Turning now to FIG. 14, the Option module is presented. At test 2110, the format applied in displaying the form may be switched from "sketch" having a low resolution but fast draw speed, and WYSI-WYG—a slower but more precise rendering.

A second option is directed to adjusting the ruler units of the display grid, test 2130; new units are entered at block 2140. At test 2150, the "origin" may be shifted from a local to absolute orientation. Absolute is set by convention at the upper left hand corner of the form. A local origin is set by cursor placement.

At test 2170, the redraw function may be selected. This permits the replacement of the current form on display with a separate view. The view of the form set for display may be adjusted pursuant to test 2200 and the series of options in blocks 2210–2240. The Option module terminates at block 2250.

Figure 15:
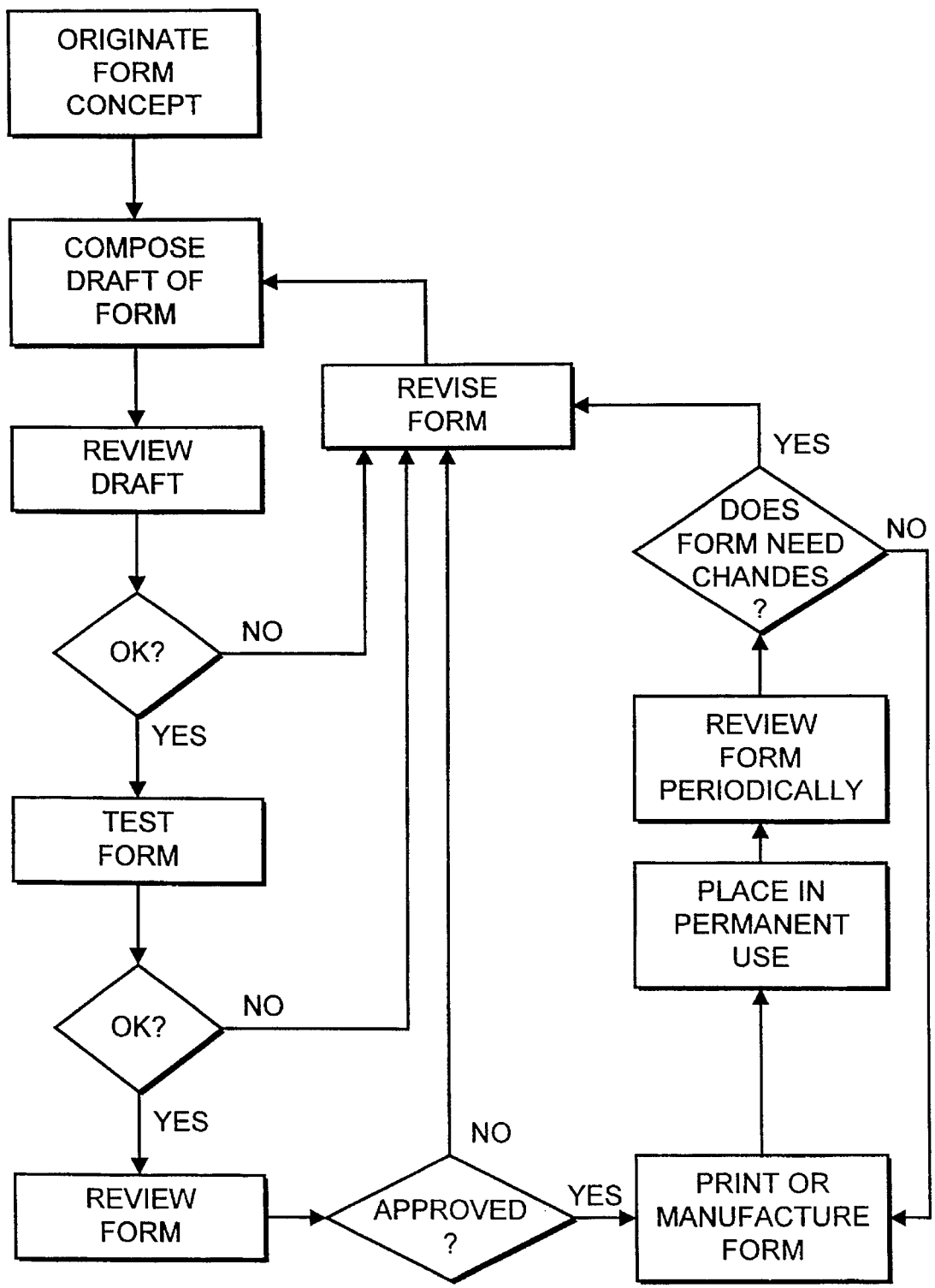
FIG. 15 provides a logic flow chart for the form engineering process, as implemented with the present invention.

The foregoing system functions are implemented in form engineering pursuant to the technique disclosed in FIG. 15. This presentation depicts the chronological progression applied in preparing a form with specific iterative reviews to insure a satisfactory result. The elements of FIG. 15 are self-descriptive and require no further embellishment.

EXAMPLE

The implementation of the above system functions is presented in the following illustrative example. Generation of the form in this Example is provided on an IBM compatible 386SX CPU computer system with a Hewlett Packard Laserjet II printer and VGA monitor. The program instructions are stored on the 80 MEG hard disk drive and configured to the defined peripherals.

The form to be engineered in an invoice for an advertising agency, Starting with FIG. 2, the edit program is selected (test 130), providing the options depicted in FIG. 4. The user thereafter selects ProDesigner subroutine test 410, entering the form generation phase of the system logic. Turning to FIG. 7, the function modules associated with ProDesigner are displayed to user.

The user must first create a new file for his form. A positive response to test 605 permits the designation of the file. This is provided in more detail in FIG. 8. This form is an invoice and, therefore, the user calls out an invoice kit from disk, test 750. A new file is created and named "AAA.fdb". The invoice kit provides a rudimentary start for the desired form.

With the ported kit, the user selects the Form module (test 615—in FIG. 9). Selected constraints are thereafter systematically entered. For this form, the user relies heavily on the embedded default values, limiting the form to a single page, 8½×11", black ink, and other options as enumerated therein.

In this example, the user needs the company logo and therefore selects an EPS image, test 780 and block 800. More specifically, the user identifies the location on the form for placement of the logo and thus calls out the logo via the File module in FIG. 8.

The user needs to have the invoice created with two holes on the top of the form. FIG. 10, block 1240, permits entry of this. The user selects two holes, top, and the system automatically determines the most common diameter, center-to-center and center-to-edge specifications, and the holes are thereafter placed on the form.

The resulting form is now complete, except for several graphic elements. The user enters the Draw module (FIG. 11), and designates a series of parallel vertical lines (test 1500 and block 1520), and a mailing label rectangle (test 1470 and block 1480). The vertical lines create columns for invoice data.

The form is now complete. FIG. 5, the Print subsystem, generates a draft printout of the form, and separations for plate productions in block 510 and block 515. These define the artwork instructions for a local printer and a remote printing press. Blocks 520 and 525 are used to create a Specification Report describing the manufacturing specifications for the form. Other reports may be generated, including summaries of client forms with the appropriate cross reference to the newly generated invoice.

The above-described arrangement is merely illustrative of the principles of the present invention. Numerous modifications and adaptations thereof will be readily apparent to those skilled in the art without departing from the spirit and scope of the present invention.

What is claimed is:

1. A data processing system directed to preparation of a set of specifications governing the production of a form, comprising:

an interactive input means for selective entry of form constraint data including form set-up attributes which comprise a form type, press type, number of pages, use of carbon, paper type and weight, and form bindery attributes; and data processing means for collecting said form constraint data, accessing embedded system logic for selecting industry-standard default values and based thereon, determining a set of form production specifications sufficient to dictate production of a form consistent with said form constraint data and said default values.

2. The system of claim 1 further comprising a file access means for selective access of ported files for combination with said form constraint data.

3. The system of claim 2, wherein said ported files include symbol, bit image and encapsulated post script (EPS) image files.

4. The system of claim 1, wherein said form bindery attributes are selected from the group consisting of envelope window, hole designation, perforation, fold, score, staple, adhesive, carbon patches, numbering, ply labelling and call-outs.

5. The system of claim 1, wherein said form constraint data comprises text information associated with form fill-in instructions.

6. The system of claim 5, wherein said form constraint data comprises graphics-based shapes and lines.

7. A method of generating a set of specifications governing the production of a form comprising the steps of:

(a) interactively entering into a data processor specific form constraint data comprising text and graphic attributes, form set-up attributes and form bindery attributes;

(b) generating an image display representation of a form based on said form constraint data;

(c) editing said generated image display representation by modifying said form constraint data;

(d) augmenting said form constraint data with industry standard default values to provide a complete set of form specifications governing production printing of the form; and (e) outputting a set of datablock strike positions for subsequent use to control automatic fill-in operation of said form.

8. The method of claim 7, wherein said datablock strike positions are associated with field address locations on said form defining a position of data entry during said automatic fill-in operation.

9. A data processing system directed to preparation of a set of specifications governing the production of a form, comprising:

an interactive input means for selective entry of form constraint data including form set-up attributes and form bindery attributes; and data processing means for collecting said form constraint data, accessing embedded system logic for selecting industry-standard default values and based thereon, determining a set of form production specifications sufficient to dictate production of a form consistent with said form constraint data and said default values.

\* \* \* \* \*